US012809365B2

(12) United States Patent
Mack et al.

(10) Patent No.: US 12,809,365 B2
(45) **Date of Patent: *Nov. 24, 2026**

(54) METHODS FOR PROGNOSING REMAINING USEFUL LIFE

(71) Applicant: International Engine Intellectual Property Company, LLC, Lisle, IL (US)

(72) Inventors: Alex Mack, Hinsdale, IL (US); Paul Laurence Berke, Chicago, IL (US); Steven Andrew Mieland, Wheaton, IL (US); Andrei Makartchouk, Hinsdale, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 461 days.

This patent is subject to a terminal disclaimer.

(21) Appl. No.: 18/227,668

(22) Filed: Jul. 28, 2023

(65) Prior Publication Data

US 2025/0036117 A1 Jan. 30, 2025

(51) Int. Cl.

| | |
|---|---|
| ***G05B 23/02*** | (2006.01) |
| ***G07C 5/00*** | (2006.01) |
| ***H04L 12/40*** | (2006.01) |

(52) U.S. Cl.

CPC ......... *G05B 23/0283* (2013.01); *G07C 5/006* (2013.01); *H04L 12/40006* (2013.01); *H04L 2012/40215* (2013.01); *H04L 2012/40273* (2013.01)

(58) Field of Classification Search

CPC ................ G05B 23/0283; G07C 5/006; H04L 12/40006; H04L 2012/40215; H04L 2012/40273; G06F 30/15; G06F 8/37; G06F 30/20; G06F 2119/02

See application file for complete search history.

(56) References Cited

U.S. PATENT DOCUMENTS

| | | | |
|---|---|---|---|
| 6,430,486 | B1 | 8/2002 | Diaz et al. |
| 6,842,676 | B2 | 1/2005 | Rodriguez |
| 7,706,938 | B2 | 4/2010 | Palladino |

(Continued)

FOREIGN PATENT DOCUMENTS

| | | | |
|---|---|---|---|
| DE | 10297644 | T5 | 10/2005 |
| DE | 102012222650 | A1 | 6/2013 |
| DE | 102015120991 | A1 | 6/2016 |

OTHER PUBLICATIONS

Office Action for German Patent Application No. 10 2024 118 319.5, mailed Jan. 13, 2025. (13 pages).

*Primary Examiner* — Lal Ce Mang
*Assistant Examiner* — Emma Alexander
(74) *Attorney, Agent, or Firm* — Umang Khanna

(57) ABSTRACT

Described herein are embodiments of systems and methods for determining remaining useful life (RUL) of an electromechanical device. The methods may include providing a compiler and providing an external network communicatively connected with the compiler. The compiler determines forecasted reliability of the part, determines actual reliability of the part, divides forecasted reliability by actual reliability to determine forecasted useful operation time, Tx, and subtracts total operation time T from forecasted useful operation time Tx to determine RUL.

11 Claims, 5 Drawing Sheets

(56) References Cited

U.S. PATENT DOCUMENTS

| | | | | |
|---|---|---|---|---|
| 8,350,688 | B2 | 1/2013 | Wang et al. | |
| 8,386,120 | B2 | 2/2013 | Johnson | |
| 10,824,735 | B2 | 11/2020 | Kim | |
| 10,946,865 | B1 | 3/2021 | Lin | |
| 11,626,628 | B1 | 4/2023 | Budan | |
| 12,088,669 | B2 | 9/2024 | Katata | |
| 2007/0299573 | A1 | 12/2007 | Carlstrom | |
| 2008/0319599 | A1 | 12/2008 | Ptak et al. | |
| 2009/0093925 | A1 | 4/2009 | Gumbel | |
| 2010/0145565 | A1 | 6/2010 | Rodriguez et al. | |
| 2010/0185356 | A1 | 7/2010 | Haas et al. | |
| 2011/0088374 | A1 | 4/2011 | Johnson | |
| 2011/0153142 | A1 | 6/2011 | Delaney et al. | |
| 2014/0100737 | A1 | 4/2014 | Haap | |
| 2015/0032310 | A1* | 1/2015 | Zettel | B60W 20/16 180/65.265 |
| 2016/0163130 | A1* | 6/2016 | Zagajac | G07C 5/0808 701/29.1 |
| 2018/0315106 | A1 | 11/2018 | Leos | |
| 2019/0042675 | A1 | 2/2019 | Martin | |
| 2020/0234515 | A1 | 7/2020 | Gronsbell | |
| 2021/0192867 | A1 | 6/2021 | Fang | |
| 2021/0284179 | A1 | 9/2021 | Diamond | |

* cited by examiner

METHODS FOR PROGNOSING REMAINING USEFUL LIFE

TECHNOLOGICAL FIELD

The present disclosure relates to systems and methods for prognosing the Remaining Useful Life (RUL) of automotive parts.

BACKGROUND

Remaining useful life (RUL) of a vehicle part is the amount of time that the part can continue to operate effectively without being repaired or replaced. Determining RUL of a vehicle part accurately substantially eliminates unnecessary expense due to premature replacement of the part. Such premature replacement of vehicle parts occurs as a result of pre-determined schedules published by vehicle manufacturers that does not account for degree of actual use of the vehicle.

Conventional prognostic tools for determining RUL of automotive parts utilize on-board diagnostics (OBD) or performance based prognostic models. OBD involves electronic communication between various vehicle parts and an electronic control unit (ECU). Certain vehicle parts, however, are not communicatively connected with an ECU.

Performance based prognostic models extrapolate RUL estimates based on performance metrics. Such performance-based models are an imprecise proxy for degree of actual use of specific vehicle parts and, therefore, may be unreliable.

What is needed are systems and methods for determining RUL of a vehicle part that are based on actual use of the vehicle in operating modes impacting the vehicle part of interest. What is needed are systems and methods for estimating RUL of substantially all vehicle parts regardless of whether they are communicatively connected with an ECU.

SUMMARY

Described herein are embodiments of systems and methods for determining remaining useful life (RUL) of a vehicle part included in and/or on a vehicle. The methods may include providing a compiler and providing a dealer network communicatively connected with the compiler. In an embodiment, the methods may further include providing one or more sensors located in and/or on a vehicle part. The sensor(s) may be communicatively connected with the compiler. The compiler determines forecasted reliability of the vehicle part, determines actual reliability of the vehicle part, divides forecasted reliability by actual reliability to determine forecasted useful operation time, Tx, and subtracts total operation time T from forecasted useful operation time Tx to determine RUL. Systems and methods described herein may be applied to conventional trucks, hybrid vehicles, and electric vehicles, without limitation. Systems and methods described herein may be applied to other electro-mechanical devices as well.

DETAILED DESCRIPTION

Figure 1:
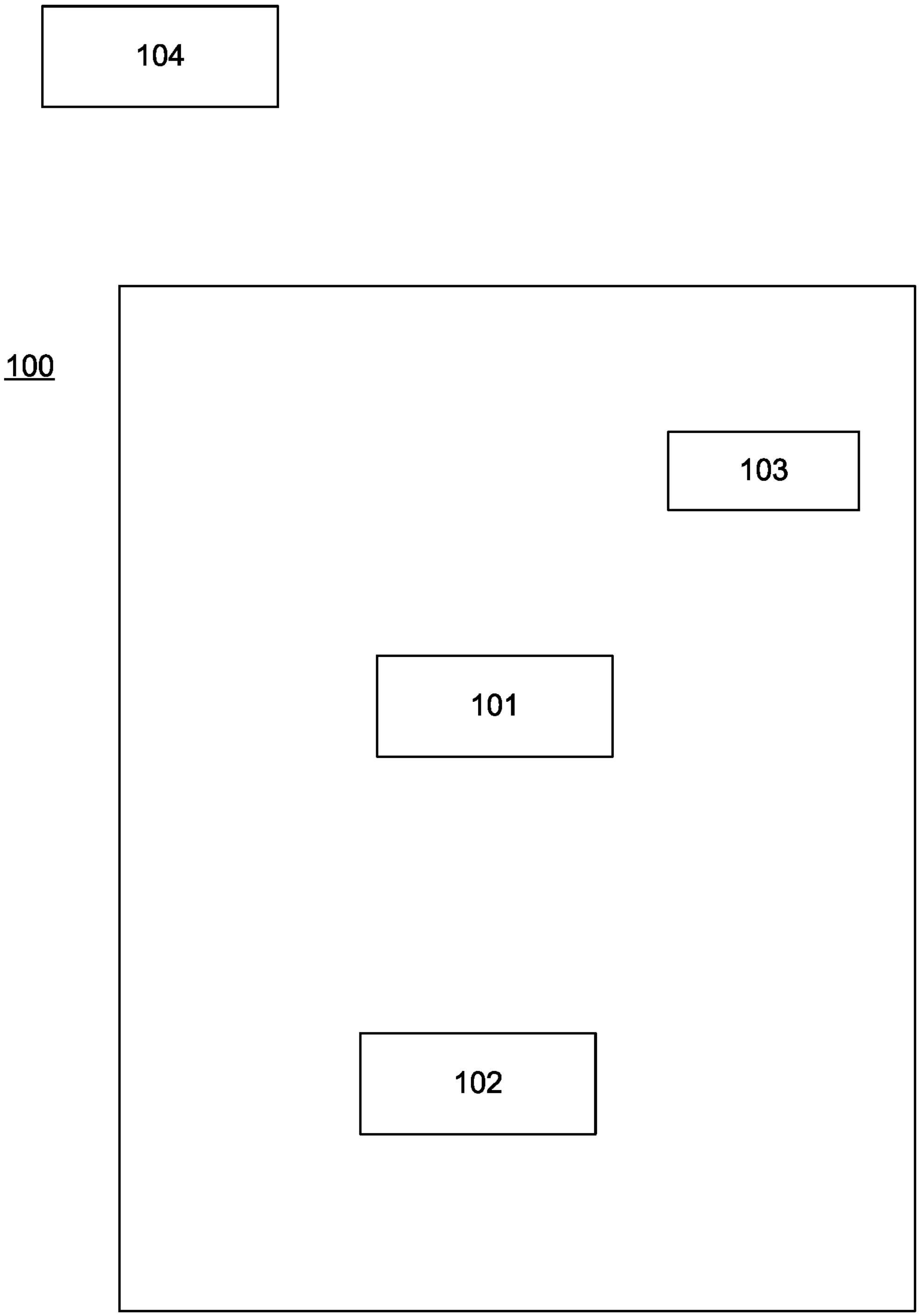
FIG. 1 is a diagram representing a system for prognosing RUL of a vehicle part as described herein.

The following disclosure concerns embodiments of a system and embodiments of a method for determining Remaining Useful Life ("RUL") of vehicle parts included in and/or on vehicles. Systems and methods described herein may be used to determine the RUL of virtually any automotive part in any type of vehicle (e.g., conventional vehicle, hybrid vehicle, electric vehicle).

For purposes of clearly describing the parts, features, and method steps discussed throughout this disclosure, some frequently used symbols and terms will now be defined. "T," as it is used throughout this disclosure, refers to total time that a vehicle part is in operation. As used throughout this disclosure, T means the operating time from the moment a vehicle left the assembly line to the moment of prognostic estimation.

"A," "B," "C," "D," and so on may be used to denote a specific mode of operation of a vehicle, whether it be, without limitation, a conventional truck 300, a hybrid vehicle 301, or an electric vehicle 302. When systems of the present disclosure are implemented in a conventional truck, said operating mode may be selected from the group 303 consisting of start, idle, run, and stop.

In an embodiment, when systems of the present disclosure are implemented in a conventional truck that is idling, "A," "B," "C," and "D," may be used to denote 304 variously that the vehicle is warming up, that the vehicle is running under normal conditions, that the vehicle is engaged in stationary regenerative braking, or that the vehicle is engaged in desorb with increased engine speed and exhaust temperatures.

In an embodiment, when systems of the present disclosure are implemented in a conventional truck that is running, "A," "B," and "C," may be used to denote 305 variously that the vehicle is warming up, that the vehicle is running under normal conditions, or that the vehicle is engaged in regenerative braking.

In an embodiment, a system according to the present disclosure may be implemented in a hybrid vehicle. In such an embodiment, "A," "B," and "C," may be used to denote 306 variously that the vehicle is starting, that the vehicle is idling, that the vehicle is running, and that the vehicle has stopped.

In an embodiment, when systems of the present disclosure are implemented in a hybrid vehicle that is running, operating modes "A," "B," "C," and "D" may be used to denote 307 variously that the vehicle is operating utilizing electric power only, that the vehicle is operating in electric assist mode, that the battery is charging, or that the vehicle is engaged in regenerative braking.

In an embodiment, when systems of the present disclosure are implemented in an electric vehicle, operating modes "A," "B," "C," and "D" may be used to denote 308 variously that the vehicle is starting, that the vehicle is running, and that the vehicle has stopped.

In an embodiment, when systems of the present disclosure are implemented in an electric vehicle that is running, "A,"

"B," and the like may be used to denote 309 variously different driving modes such as, without limitation, normal or high efficiency.

In an embodiment, when systems of the present disclosure are implemented in an electric vehicle that is running, "A," "B," "C," and the like may be used to denote 310 different braking modes such as, without limitation, creep, roll, or hold.

In an embodiment, when systems of the present disclosure are implemented in an electric vehicle that is running, "A" and "B" may be used to denote whether or not the battery is charging. According to such an embodiment, "A" may be used to indicate that the battery is charging while "B" may be used to indicate that the battery is not charging.

In an embodiment, when systems of the present disclosure are implemented in an electric vehicle that is running, "A," "B," and the like may be used to denote variously whether or not the vehicle is engaged in regenerative braking.

The numerals "1" and "0," as used throughout this disclosure in connection with a particular operating mode, shall denote whether, for a given operating mode (i.e., "A," "B," etc.), a particular automotive part is being impacted; in other words, whether the particular automotive part is doing work at the operating mode.

"$T_A$," $T_B$," "$T_C$," etc., as used throughout this disclosure, shall denote the total time that a vehicle has been operating in a particular operating mode (e.g., start mode, idle mode, etc.). As used throughout this disclosure, $T_A$, $T_B$, $T_C$, etc. refers to the total time that a vehicle has operated in the particular operating mode from the moment the vehicle left the assembly line to the moment of prognostic estimation.

"N," as used throughout this disclosure, shall denote the total number of vehicles in operation as communicated from dealer networks.

"M," as used throughout this disclosure, shall denote the total number of vehicles in which a particular part has failed as communicated from dealer networks.

"P(Tx)," as used throughout this disclosure, shall denote the prognosed reliability of a particular automotive part at forecasted operation time (Tx).

"$M_{TH}$," as used throughout this disclosure, shall denote a threshold number of failures for a particular part.

"RUL," as used throughout this disclosure, refers to the remaining useful life of a particular automotive part.

Systems and methods described herein may be used to determine RUL of vehicle parts that are communicatively connected with an ECU. Systems and methods described herein may be used to determine the RUL of vehicle parts that are not communicatively connected with an ECU. Parts within the latter group may include, without limitation, wheel bearings, links in a vehicle suspension, a driveshaft, and parts of a powertrain (e.g., an engine, a transmission, a differential, and an axle shaft).

Systems and methods described herein may comprise a compiler 101 that may be communicatively connected with an ECU. In such an embodiment, the ECU may transmit to the compiler 101 in substantially real time data regarding the amount of time that a vehicle 100 has been in each operating mode. The compiler 101 may be programmed to determine, for each vehicle part 102, whether or not that part is working during when the vehicle 100 is in each operating mode.

In another embodiment, systems and methods described herein may comprise a compiler 101 that receives actual data from sensors located in and/or on vehicle parts 102 regarding the amount of time that the vehicle part 102 has been in operation compared to forecasted total useful life of the vehicle part 102 to determine RUL.

Systems and methods described herein allow for defining and predicting RUL using statistical data from dealer networks 104, and controller area network (CAN) messages regarding actual time in operation transmitted by a CAN bus 103 to a compiler 101. Systems and methods for determining RUL as described herein do not require use of on-board diagnostics (OBD).

Systems and methods described herein may utilize statistical data provided by dealer networks 104, 400, 500 to determine acceptable threshold limits for number of failures of a given vehicle part ($M_{TH}$). Based on those threshold limits, systems and methods described herein may be used to determine forecasted reliability (i.e., total useful life; P(Tx)) for a given vehicle part.

Systems and methods described herein may utilize data 401, 501 regarding actual operating time of a vehicle in various operating modes ($T_A$, $T_B$, $T_C$, etc.), and actual operating time of a vehicle part specifically in determining total actual operating time (T) of the vehicle part.

By comparing total actual operating time of a vehicle part (T) to prognosed reliability based on statistical data provided by dealer networks, systems and methods described herein may be used to determine RUL 402, 502. Specifically, by subtracting total time that the vehicle part has been in operation (T) from the forecasted useful life of the part (Tx), RUL of the vehicle part may be determined.

Embodiments of systems and methods described herein may comprise a CAN bus 103. In an embodiment, the one or more sensors located in and/or on parts 102 located throughout a vehicle 100 may be communicatively connected with the compiler 101 through the CAN bus. The CAN bus may facilitate transmission of electronic messages (i.e., CAN messages) from the sensor(s) to the compiler 101.

Embodiments may comprise an external computerized device 104 communicatively connected with a compiler 101 located within a vehicle 100. In that embodiment, the external computerized device may be connected to a database comprising historical statistical data regarding vehicle part failures. Such data may include number of vehicles in operation (N), number of failures of particular vehicle parts (M), and historic failure rates for specific vehicle parts that may serve as maximum or threshold limits of acceptable number of failures ($M_{TH}$).

Embodiments may utilize a model, such as that depicted in FIG. 1, to estimate RUL of a vehicle part. In an embodiment, RUL may be determined by calculating a prognosed reliability of a vehicle part, P(Tx) (calculation 6), taking the negative natural log of P(Tx) (calculation 7), dividing that value by the actual failure rate A of the part at total operating time T (calculation 8), to yield the useful life of the part (Tx) and subtracting total operating time T from Tx, to yield RUL (calculation 9).

Actual failure rate Λ of a part may be determined using the following model which model may be applied for each applicable operating mode 303, 304, 305, 306, 307, 308, 309, 310. $T_A$ (or $T_B$, $T_C$, etc.), total time at a particular operating mode A (B, C, etc.), divided by total time the vehicle is in operation, T, (calculation 2), yields the percentage of time that the vehicle is in the particular operating mode. In certain operating modes, the vehicle part under consideration may not be working and, therefore, the amount of time that the vehicle is in this operating mode will not impact this calculation. The percentage of total operating time T that the part is working may then be determined by adding $T_A$, $T_B$, $T_C$, etc. The resulting value may then be multiplied, calculation 3, by the percentage of vehicles in which the part is working properly (i.e., N−M/N; calculation 1). One can then, in calculation 4, take the negative natural log of the product of calculation 3. One can then divide the result of calculation 4 by total time T, calculation 5, to determine the actual failure rate A of the part at total time T, calculation 6.

In an embodiment, the compiler 101, may be programmed to determine the amount of time that a particular part 102 has been in operation based on data from the ECU indicating total time in each operating mode, together with information programmed into the compiler 101 regarding whether, for each vehicle part, that part is working at each operating mode.

In another embodiment, data regarding the amount of time that a particular part 102 has been in operation may be collected utilizing sensors located on or near the part 102. These sensors may be communicatively connected with a compiler 101.

In an embodiment, data regarding the number of vehicles in operation (N), the number of failures of a particular part (M), and an acceptable threshold number of failures ($M_{TH}$) as determined based on historical statistical data provided by dealer networks 104 may be transmitted from vehicle dealer networks 104 to the compiler 101.

In an embodiment, the compiler may comprise a computer program installable to an ECU located within the vehicle. According to such an embodiment, the compiler 101 may be added to an existing ECU in a vehicle as a software update. In another embodiment, the compiler may be contained within a standalone computerized device located within the vehicle.

While described herein are systems and methods for determining RUL of vehicle parts, said systems and methods may readily be utilized to determine RUL of any number of other machines and devices. Systems and methods described herein may be used to determine RUL of airplane parts and locomotive parts, as well as parts of electric fans, washing and drying machines, and other electro-mechanical devices.

EXAMPLE 1

The following is an illustrative example of how a system or method described herein may be applied in a conventional truck to determine RUL of a wheel bearing.

For purposes of this example, the vehicle's total time in operation will be 15,000 hours; i.e., T=15,000 hrs. There are 5,000 trucks in operation (N=5,000). From dealer networks, we know that the forecasted number of trucks that will have the failed part is 10 ($M_{TH}$=10). The part has actually failed 6 times (M=6).

The truck was in start mode for 750 hours ($T_A$), was idling for 3,000 hours ($T_B$), running for 5,250 hours ($T_C$), and stopped for 6,000 hours ($T_D$).

Figure 2:
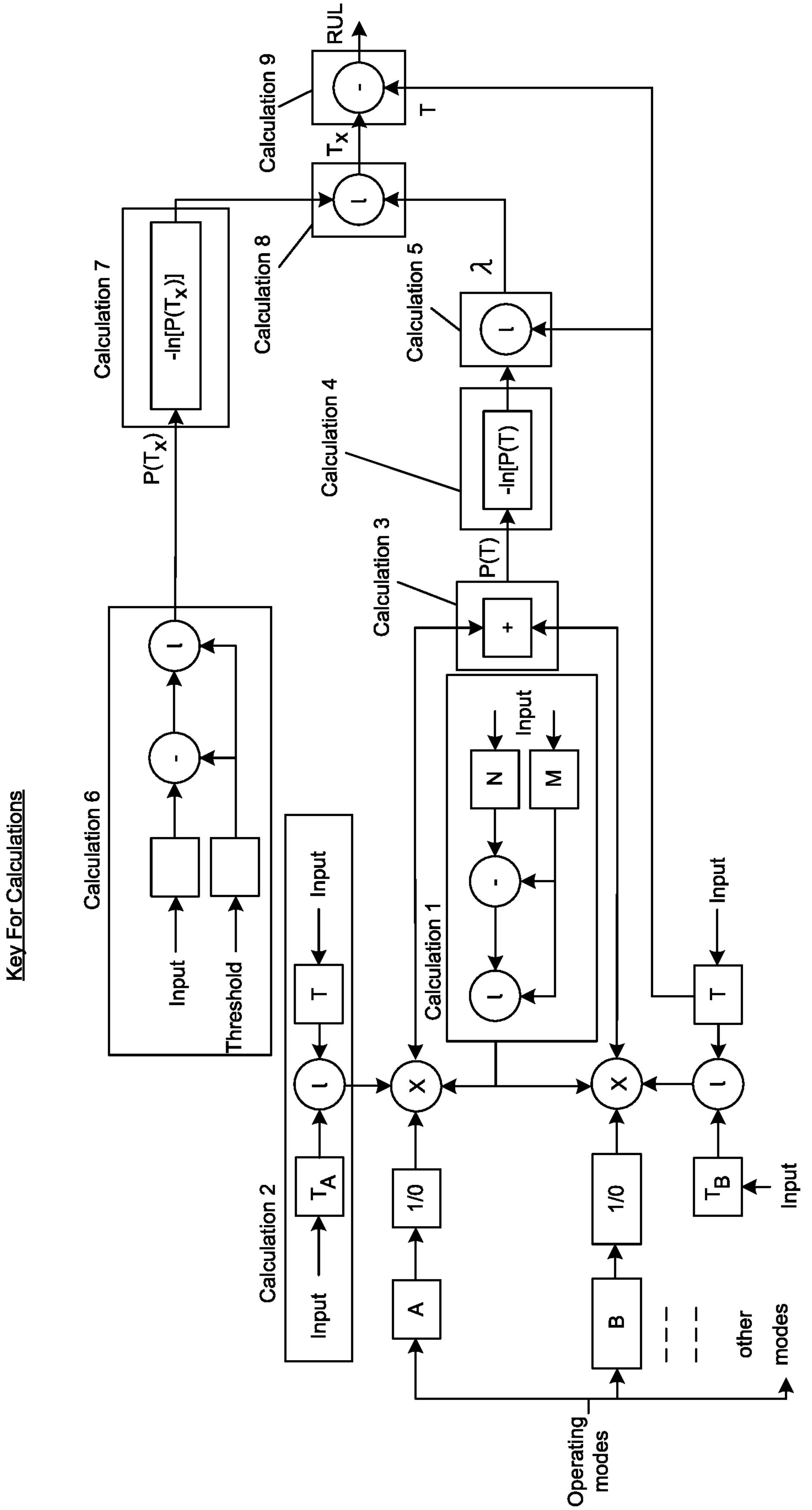
FIG. 2 is an annotated flowchart depicting the logic according to which systems and methods described herein output an RUL value for a particular vehicle part.
Figure 3:
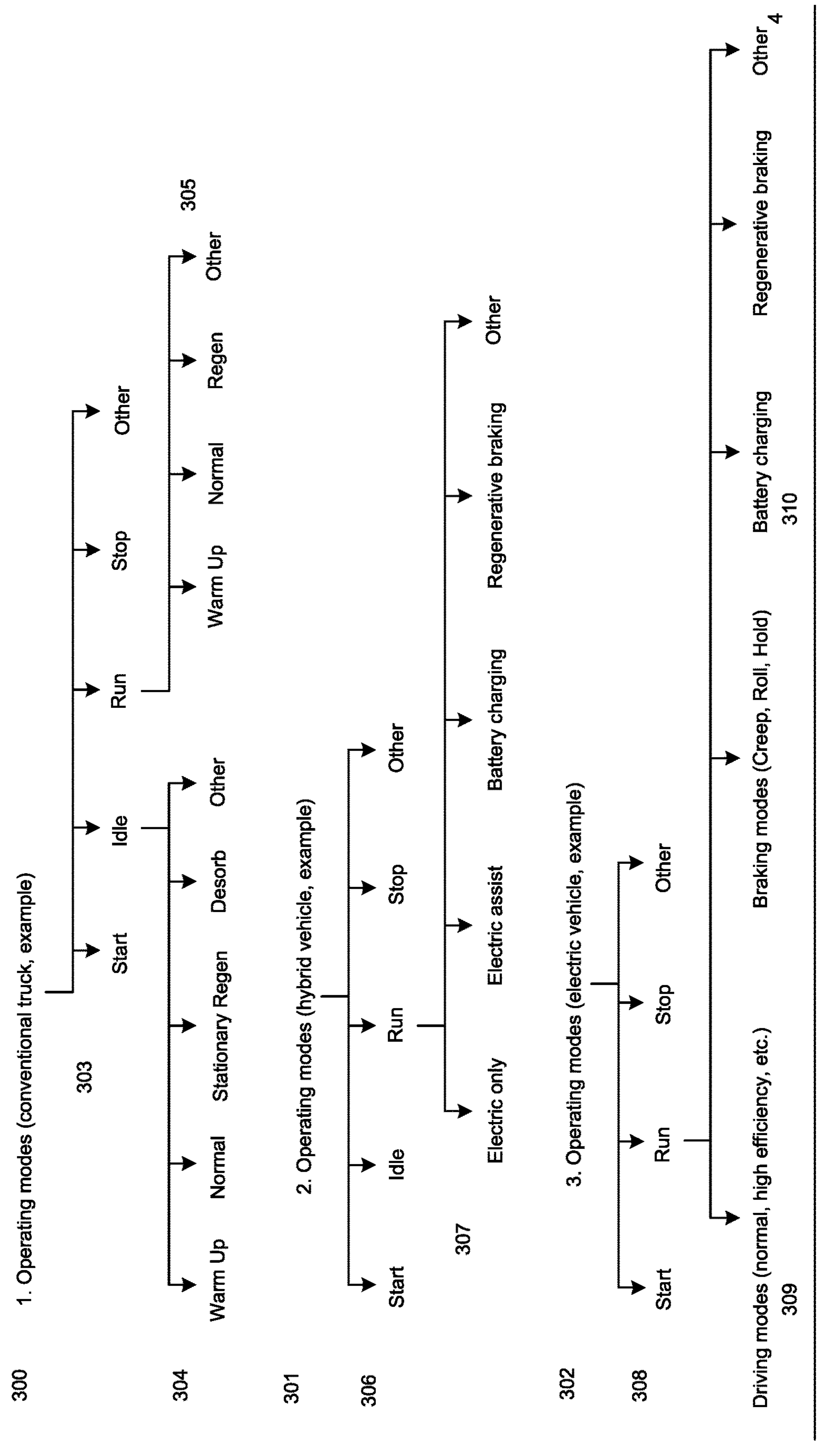
FIG. 3 is a chart depicting examples of different operating modes in a conventional truck, in a hybrid vehicle, and in an electric vehicle.
Figure 4:
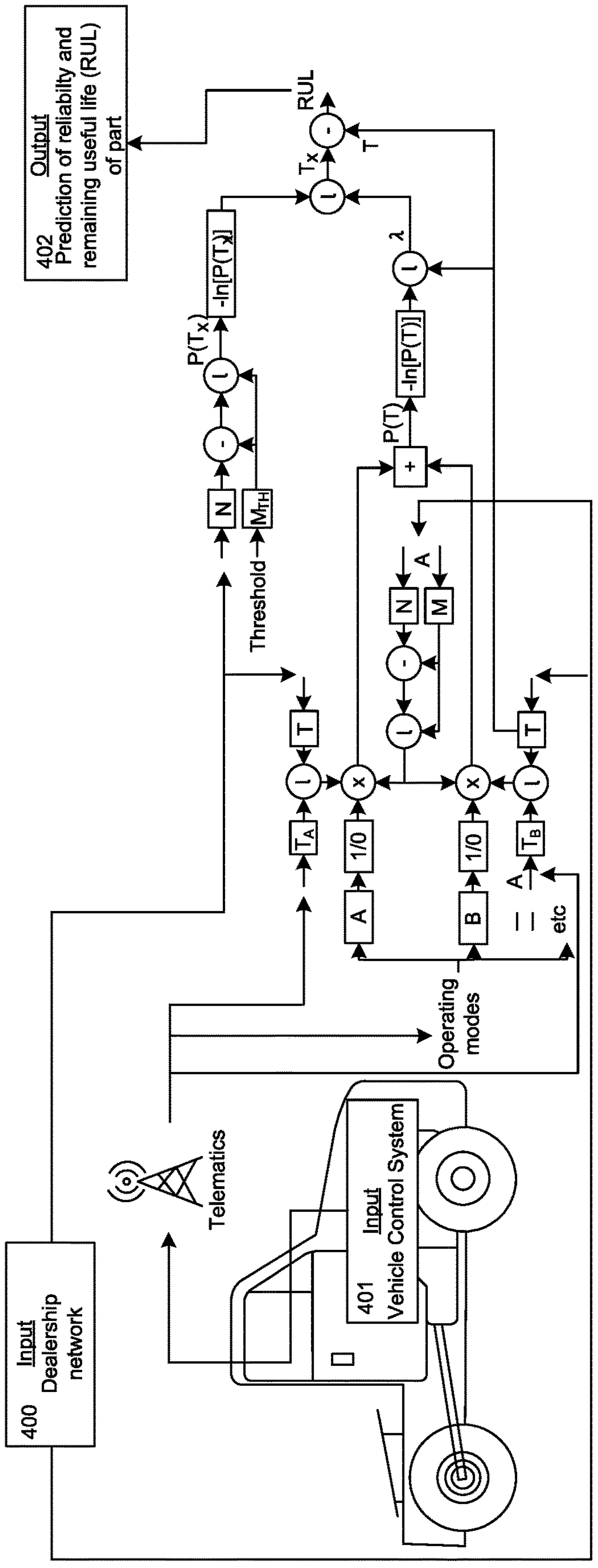
FIG. 4 is a diagram representing a standalone version of a prognostic system for determining RUL of a vehicle part.
Figure 5:
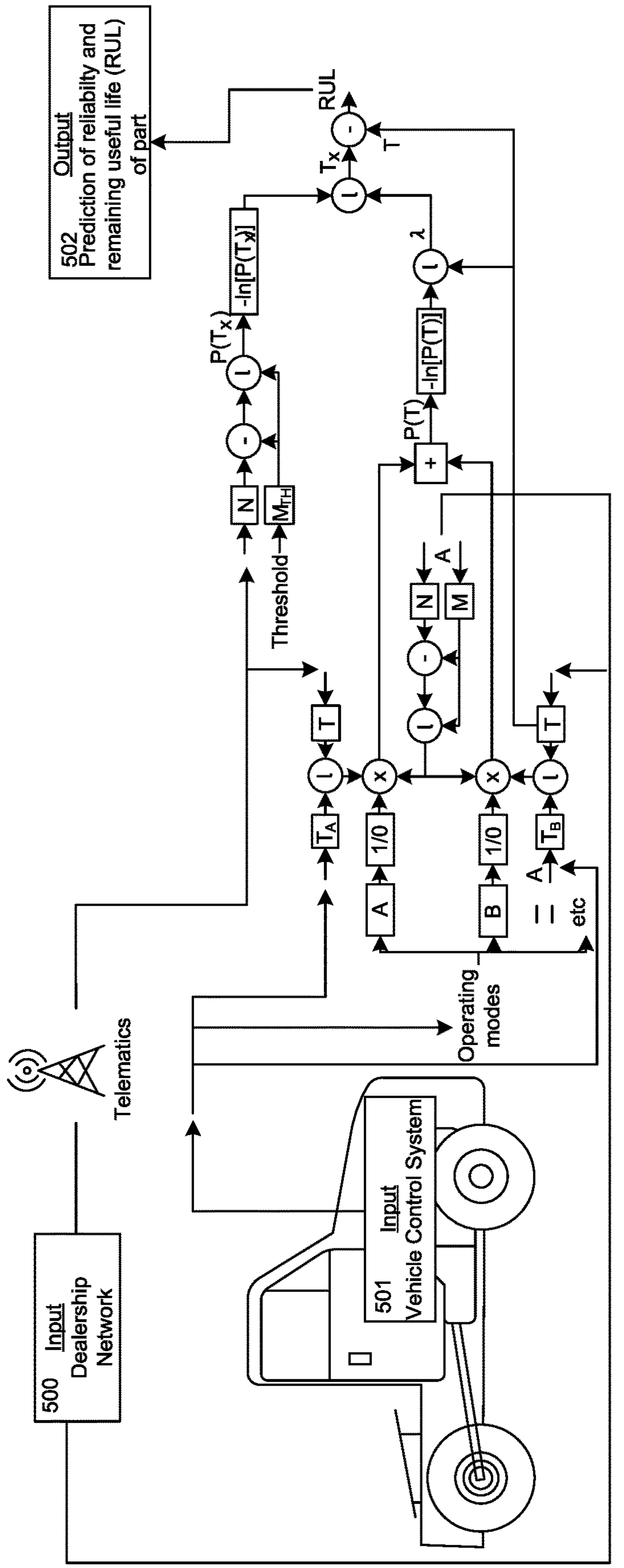
FIG. 5 is a diagram representing an onboard version of a prognostic system for determining RUL of a vehicle part.

Referring to Figure 2, regarding calculation 1: $(N-M)/M$;

$$5{,}000-6/5{,}000=4{,}994/5{,}000=0.9988.$$

Regarding calculation 2:

$$T_A/T=750/15{,}000=0.05$$

$$T_B/T=3{,}000/15{,}000=0.2$$

$$T_C/T=5{,}250/15{,}000=0.35$$

$$T_D/T=6{,}000/15{,}000=0.4$$

Regarding calculation 3($T_D$ does not involve work by wheel bearings):

-continued $$\text{Calculation } 1\times(T_A+T_B+T_C+0)$$

$$0.9988\times(0.05+0.2+0.35)$$

$$0.9988\times 0.6=0.59928$$

Regarding calculation 4:

$$-\ln[P(T)]$$

$$-\ln[0.59928]=0.00120072$$

Regarding calculation 5:

$$-\ln[P(T)]/T=0.00120072/15{,}000=0.000000060048$$

Regarding calculation 6:

$$(N-M_{TH})/N=(5{,}000-10)/5{,}000=4{,}990/5{,}000=0.998$$

Regarding calculation 7:

$$-\ln[P(Tx)]$$

$$-\ln[0.998]=0.00200200$$

Regarding calculation 8:

$$\text{Result of calculation 7/result of calculation 5} = 0.00200200/8.0048\times10^{-8}=25{,}009.994$$

Regarding calculation 9:

$$T_x-T=25{,}009.994-15{,}000=10{,}009.994$$

Thus, there remains approximately 10,000 hours of useful life for this vehicle part.

EXAMPLE 2

The following is an illustrative example of how a system or method described herein may be applied in an electric vehicle to determine RUL of a battery.

For purposes of this example, the vehicle's total time in operation will be 4,000 hours; i.e., T=4,000 hrs. There are 7,000 vehicles in operation (N=7,000). From dealer networks, we know that the forecasted number of vehicles that will have the failed part is 10 ($M_{TH}$=15). There have been 10 instances of the part actually having failed (M=10).

The vehicle was in start mode for 700 hours ($T_A$), running for 1,800 hours ($T_B$), and stopped for 1,500 hours ($T_C$).

Referring to Figure 2, regarding calculation 1: $(N-M)/M$;

$$7{,}000-10/7{,}000=4{,}994/5{,}000=0.9986.$$

Regarding calculation 2:

$$T_A/T=700/4{,}000=0.175$$

$$T_B/T=1{,}800/4{,}000=0.45$$

$$T_C/T=1{,}500/4{,}000=0.375$$

Regarding calculation 3:

$$\text{Calculation } 1\times(T_A+T_B+T_C+0)$$

$$0.9986\times(0.175+0.45+0.375)$$

$$0.9986\times 1=0.9986$$

Regarding calculation 4:

$$-\ln[P(T)]$$

$$-\ln[0.9986]=0.0014$$

-continued

Regarding calculation 5:

$$-\ln[P(T)]/T = 0.0014/4{,}000 = 3.5\times10^{-7}$$

Regarding calculation 6:

$$(N - M_{TH})/N = (7{,}000 - 15)/7{,}000 = 6{,}985/7{,}000 = 0.9979$$

Regarding calculation 7:

$$-\ln[P(Tx)]$$

$$-\ln[0.9979] = 0.00210220809$$

Regarding calculation 8:

$$\text{Result of calculation 7/result of calculation 5} = .00210220809/3.5\times10^{-7} =$$

Regarding calculation 9:

$$T_x - T = 6{,}006.31 - 4{,}000 = 2{,}006.31$$

Thus, there remains approximately 2,006 hours of useful life for this vehicle part.

What is claimed is:

1. A method for determining remaining useful life (RUL) of a vehicle part included in and/or on a vehicle comprising:

providing a compiler; and providing a dealer network communicatively connected with the compiler;

providing one or more sensors communicatively connected with the compiler and located in and/or on the vehicle part;

wherein the compiler determines forecasted reliability of the vehicle part, determines actual reliability of the vehicle part, divides forecasted reliability by actual reliability to determine forecasted useful operation time, Tx, and subtracts total operation time T from forecasted useful operation time Tx to determine RUL.

2. The method of claim 1, wherein the one or more sensors are communicatively connected with the compiler through a controller area network.

3. The method of claim 1, wherein the compiler comprises a computer program installable to an electronic control unit located within the vehicle.

4. The method of claim 1, wherein the compiler is contained within a standalone computerized device.

5. The method of claim 4, wherein the compiler is located within the vehicle.

6. The method of claim 1, wherein the vehicle is a conventional truck.

7. The method of claim 1, wherein the vehicle is a hybrid vehicle.

8. The method of claim 1, wherein the vehicle is an electric vehicle.

9. The method of claim 6, wherein operating modes of the vehicle comprise start, idle, run, and stop.

10. The method of claim 7, wherein operating modes of the vehicle comprise start, idle, run, and stop.

11. The method of claim 8, wherein operating modes of the vehicle comprise start, run, and stop.

* * * * *